United States Patent [19]
Sestanj et al.

[11] 3,821,383
[45] June 28, 1974

[54] COMPOSITIONS FOR AND A METHOD OF TREATING DIABETIC COMPLICATIONS

[75] Inventors: Kazimir Sestanj, Laval; Nicole Simard-Duquesne; Dusan M. Dvornik, both of Montreal, all of Canada

[73] Assignee: Ayerst McKenna and Harrison Limited, Laurent, Quebec, Canada

[22] Filed: July 10, 1972

[21] Appl. No.: 270,357

[52] U.S. Cl. ............................................. 424/258
[51] Int. Cl. .......................................... A61k 27/00
[58] Field of Search ................................... 424/258

[56] References Cited
OTHER PUBLICATIONS
Helv. Chim. Acta, 21, 1466 (1938) Pages 1466, 1474 & 1475

Primary Examiner—Albert T. Meyers
Assistant Examiner—Frederick E. Waddell

[57] ABSTRACT

New pharmaceutical compositions, including methods for their preparation and for their use in preventing or relieving diabetic complications are disclosed. More specifically, the pharmaceutical compositions of this invention comprises 1,3-dioxo-1H-benz[de]isoquinoline-2(3H)-acetic acid, and optionally substituted derivatives thereof together with their pharamaceutically acceptable salts.

5 Claims, No Drawings

COMPOSITIONS FOR AND A METHOD OF TREATING DIABETIC COMPLICATIONS

BACKGROUND OF THE INVENTION

1. Field of the Invention

This invention relates to new pharmaceutical compositions and methods for using same for the purpose of preventing and treating complications associated with diabetes mellitus. More specifically, the compositions of this invention are useful for the prevention and treatment of certain diabetic complications including diabetic cataracts, neuropathy, nephropathy and retinopathy.

2. Description of the Prior Art

It has now been established that high levels of hexoses, e.g., glucose, galactose, etc., lead to the accumulation of polyols, e.g., sorbitol, galactitol, etc., in certain tissues. Such high levels occur, for example, in galactosemia and diabetic complications. In the eye, this accumulation of polyols results in cataract formation with concomitant loss of lens clarity. The pioneering investigations of J. H. Kinoshita and collaborators, see J. H. Kinoshita, et al., Biochem. Biophys. Acta., 158, 472 (1968) and references cited therein, have demonstrated that aldose reductase, an enzyme involved in the reduction of aldoses to the corresponding polyols, plays a central role in the etiology of galactosemic cataracts by effecting the conversion of galactose to dulcitol (galactitol) and that an agent capable of inhibiting aldose reductase can prevent this detrimental accumulation of dulcitol in the lens. Furthermore, a relationship between elevated levels of glucose and an undesirable accumulation of the corresponding polyol, sorbitol, has been demonstrated in the lens, peripheral nervous cord and kidney of diabetic animals, for example, see A. Pirie and R. van Heyringen, Exp. Eye Res., 3, 124 (1964), L. T. Chylack and J. H. Kinoshita, Invest. Ophthal., 8, 401 (1969), J. D. Ward and R. W. R. Baker, Diabetol., 6, 531 (1970). Accordingly, an agent that shares the properties of inhibition of aldose reductase and of low toxicity in animals would be a desirable therapeutic agent for the treatment of diabetic complications such as cataracts, neuropathy and nephropathy. It is the purpose of this invention to disclose such useful agents as well as methods for their application for alleviating or providing a prophylactic treatment for diabetic complications.

SUMMARY OF THE INVENTION

According to this invention an aldose reductase inhibiting amount of the benzoisoquinoline acetic acid derivative of the formula I

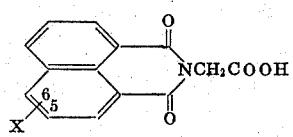

in which X is selected from the group consisting of hydrogen, 5-nitro-, 5-amino and 6-bromo or a pharmaceutically acceptable salt thereof with an organic or inorganic base, is administered to a diabetic mammal whereby diabetic complications are prevented or relieved.

DETAILS OF THE INVENTION

The benzoisoquinoline acetic acid derivatives of this invention of formula I form addition salts with suitable inorganic and organic bases. These salts possess the same activities as the parent acid compound when administered to animals and may be utilized in the same manner. Suitable bases to form these salts include, for example, the hydroxides, lower alkoxides, carbonates and bicarbonates of sodium, potassium, calcium and magnesium, as well as the bases, ammonia, triethylamine, benzylamine and the like. The addition salts thus obtained are the functional equivalents of the parent acid compound in respect to their therapeutic use. Hence, these addition salts are included within the scope of this invention and are limited only by the requirement that the bases employed in forming the salts be pharmaceutically acceptable.

A preferred compound as the active ingredient in the methods and compositions of this invention is 1,3-dioxo-1H-benz[de]isoquinoline-2(3H)-acetic acid (I, X = H). This compound and its preparation have been described by H. E. Fierz-David and C. Rossi, Helv. Chim. Acta, 21, 1466 (1938) and by H. Stephen, J. Chem. Soc., 871 (1931).

Other compound illustrative of this invention are 6-bromo-1,3-dioxo-1H-benz[de]isoquinoline-2(3H)-acetic acid, 5-nitro-1,3-dioxo-1H-benz[de]isoquinoline-2(3H)-acetic acid and 5-amino-1,3-dioxo-1H-benz[de]isoquinoline-2(3H)-acetic acid. The 6-bromo and 5-nitro derivative are prepared readily by reacting the appropriately substituted 1,8-naphthalic acid anhydride, namely, 4-bromo-1,8-naphthalic acid anhydride, described by H. G. Rule and S. B. Thompson, J. Chem Soc., 1764 (1937), and 3-nitro-1,8-naphthalic acid anhydride, described by F. Anselm and F. Zuckmayer, Ber. 32, 3283 (1899), respectively, with glycine at about 100° to 200° C for about 15 minutes to 6 hours according to the procedure of A. K. Bose, et al., J. Org. Chem., 23, 1335 (1958), for preparing N-phthaloylglycine. The 5-amino derivative is prepared by hydrogenating the above 5-nitro compound in the presence of Raney nickel. It should be noted also that the method of A. K. Bose, cited above is a most convenient method for preparing 1,3-dioxo-1H-benz[de]isoquinoline-2(3H)-acetic acid from 1,8-naphthalic acid anhydride and glycine.

The compounds of this invention and their addition salts with pharmaceutically acceptable organic or inorganic bases may be administered to mammals, for example, man, cattle or rabbits, either alone or in dosage forms, i.e., capsules or tablets, combined with pharmacologically acceptable excipients, see below. Advantageously the compounds of this invention may be given orally. However, the method of administering the present active ingredients of this invention is not to be construed as limited to a particular mode of administration. For example, the compounds may be administered topically directly to the eye in the form of drops of sterile, buffered ophthalmic solutions, preferably of pH 7.2 – 7.6. Also, they may be administered orally in solid form containing such excipients as starch, milk sugar, certain types of clay and so forth. They may also be administered orally in the form of solutions or they may be injected parenterally. For parenteral administration they may be used in the form of a sterile solution, preferably of pH 7.2 – 7.6 containing a pharmaceutically acceptable buffer.

The dosage of the present therapeutic agents will vary with the form of administration and the particular compound chosen. Furthermore, it will vary with the particular host under treatment. Generally, treatment is initiated with small dosages substantially less than the optimal dose of the compound. Thereafter, the dosage is increased by small increments until the optimal effect under the circumstances is reached. In general, the compounds of this invention are most desirably administered at a concentration level that will generally afford effective results without causing any harmful or deleterious side effects. For topical administration a 0.5–2% solution may be administered dropwise to the eye. The frequency of installation varies with the subject under treatment from a drop every two or three days to once daily. For oral or parenteral administration a preferred level of dosage ranges from about 1.0 mg. to about 1,000 mg. per kilo per day, although aforementioned variations will occur. However, a dosage level that is in the range of from about 5.0 mg. to about 50 mg. per kilo per day is most satisfactory.

Unit dosage forms such as capsules, tablets, pills and the like may contain from about 50 mg. to about 500 mg. of the active ingredients of this invention, dependent on the type of unit dosage, preferably with a significant quantity of a pharmaceutical carrier. Thus, for oral administration, capsules can contain from between about 50 mg. to about 500 mg. of the active ingredients of this invention with or without a pharmaceutical diluent. Tablets, either effervescent or noneffervescent, can contain between about 50 to 500 mg. of the active ingredients of this invention together with conventional pharmaceutical carriers. Thus, tablets which may be coated and either effervescent or noneffervescent may be prepared according to the known art. Inert diluents or carriers, for example, magnesium carbonate or lactose, can be used together with conventional disintegrating agents, for example, maize starch and alginic acid and lubricating agents, for example, magnesium stearate.

Syrups or elixirs suitable for oral administration can be prepared from water-soluble salts, for example, sodium 1,3-dioxo-1H-benz[de]isoquinoline-2(3H)-acetate, and may advantageously contain glycerol and ethyl alcohol as solvents or preservatives.

Specific examples of formulations suitable for oral, parenteral and topical administration are given in the examples.

ALDOSE REDUCTASE INHIBITING ACTIVITY

1. METHODS AND MATERIALS

The aldose reductase inhibiting effects of the benzoisoquinoline acetic acid derivatives of formula I and their pharmaceutically acceptable salts thereof with an organic or inorganic base may be demonstrated by employing an in vitro testing procedure similar to that described by S. Hayman and J. H. Kinoshita, J. Biol. Chem., 240, 877 (1965). In the present case the procedure of Hayman and Kinoshita is modified in that the final chromatography step is omitted in the preparation of the enzyme from bovine lens.

The following results were obtained when the compounds of this invention were evaluated in the above in vitro test.

| COMPOUND | CONCENTRATION m M | PERCENT INHIBITION |
|---|---|---|
| 1,3-dioxo-1H-benz[de]isoquinoline-2(3H)-acetic acid | $10^{-4}$ | 76 |
| | $10^{-5}$ | 48 |
| | $10^{-6}$ | 14 |
| 6-bromo-13,-dioxo-1H-benz[de]-isoquinoline-2(3H)-acetic acid | $10^{-4}$ | 79 |
| | $10^{-5}$ | 70 |
| | $10^{-6}$ | 40 |
| 5-nitro-1,3-dioxo-1H-benz[de]-isoquinoline-2(3H)-acetic acid | $10^{-5}$ | 64 |
| | $10^{-6}$ | 46 |
| 5-amino-1,3-dioxo-1H-benz[de]-isoquinoline-2(3H)-acetic acid | $10^{-5}$ | 62 |
| | $10^{-6}$ | 20 |

As mentioned earlier, aldose reductase converts aldoses into the corresponding polyols. This property of aldose reductase has received considerable attention during the last several years and it is now understood that aldose reductase is relatively unspecific with regard to sugar substrates, see S. Hayman and J. H. Kinoshita, J. Biol. Chem., 240, 877 (1965), and reduces, among other sugars, glucose to sorbitol and galactose to dulcitol. Experimentally, therefore, the determination of dulcitol accumulation in galactosemic animals or sorbitol in hyperglycemic, i.e., diabetic, animals gives a similar insight into the function of aldose reductase.

Accordingly, the aldose reductase inhibiting properties of the compounds of this invention and their utilization in diminishing and alleviating diabetic complications are demonstrable in experiments using either galactosemic or diabetic rats. Such experiments are exemplified hereinbelow after the listing of the following general comments (a) to (f) pertaining to these experiments:

a. When galactosemic rats are utilized in the following experiments, three groups of male rats, 50 – 70 g, Sprague-Dawley strain, are used. The first group, control group, is fed a mixture of rat laboratory chow (Purina) and glucose in the various concentrations (W/W %) noted below. The untreated galactosemic group is fed a similar diet in which galactose is substituted for glucose. The treated galactosemic group is fed a diet prepared by mixing 7 g. of a compound of formula I per kilogram of the galactose containing diet; the concentration of galactose in the diet of the treated group being the same as that for the untreated galactosemic group.

b. In the particular experiment described below employing diabetic rats, diabetes is induced by streptozotocin, prepared according to the method of E. J. Hessler and H. K. Jahnke, J. Org. Chem., 35, 245 (1970). More explicitly, diabetes is induced in overnight-fasted rats, 140 – 160 g, Sprague-Dawley strain, by injecting streptozotocin (85 mg/kg), in 0.03 M citrate buffer (pH = 4.5), into the jugular vein of the ether-anesthetized rat. Control rats receive the buffer only. Thereafter, 36 to 48 hours later, blood glucose determinations are done on samples collected from the tail vein. The streptozotocin-treated rats having less than 250 mg % glucose are eliminated on the basis of the glucose values, the diabetic animals are separated into groups using a table of random numbers so that the differences in blood glucose between the diabetic groups are statistically non-significant. The control group and the untreated diabetic group are fed powdered laboratory chow (Purina); the treated diabetic group is fed a diet containing 6 g. of a compound of formula I per kilogram of laboratory chow. Water and food are given ad libitum and the food intakes are recorded.

c. Examination of the eyes of the laboratory animals used herein is preformed with Haag-Streit slit-lamp microscope (Bern, Switzerland) after light ether anesthesia of the animal and topical application of 1% stropine sulfate to the eye. Opacities are graded as described by T. O. Sippel, Invest. Ophthal., 5, 568 (1966).

d. At the end of one experiment blood glucose concentrations are determined on samples obtained from one tail vein. The animals are then killed by decapitation. The eyeballs are removed and punctured with a scissor; the freed lenses are rolled gently on filter paper and weighed. The sciatic nerves are dissected as completely as possible and weighed. Both tissues are frozen and kept up to 2 weeks before being analyzed for polyols.

e. The polyol determination is performed by a modification of the procedure of M. Kraml and L. Cosyns, Clin. Biochem., 2, 373 (1969). Only two minor reagent changes are required: (a) The rinsing mixture is a aqueous 5% trichloroacetic solution and (b) the stock solution is prepared by dissolving 25 mg. of dulcitol in 100 ml. of an aqueous 5% trichloroacetic acid solution. [N.B.: For each experiment the average value found in the tissue from rats fed the glucose diet is substracted from the individual values found in the corresponding galactosemic rat tissue to obtain the amount of polyol accumulated. In the case of diabetic rats, the average value found in the normal rat tissue is substracted from those found in the corresponding tissue of diabetic rats].

f. Blood glucose is determined according to the method of C. S. Frings, et al., Clin. Chem., 16, 282 (1970).

2. RESULTS

The following experiments shows that the compounds of the invention diminish and alleviate the accumulation of dulcitol in the lens of rats fed galactose. The basis for this experiment is that dulcitol accumulation in the lenses of galactosemic eventually causes cellular damage and cataracts, see. J. H. Kinoshita, Invest. Opthal., 4, 786 (1965). This phenomenon also occurs in diabetics.

Accordingly, when galactosemic rats are treated with an active ingredient of the present invention, the lenses of these rats are found to contain significantly less dulcitol than those of treated rats. The results obtained in such experiments are exemplified by Table I. The data for Table I are taken from an experiment in which the rats were fed a 10% galactose diet for 3 days (control rats were fed a 10% glucose diet). Treated rats were fed a diet of 7 g of 1,3-dioxo-1H-benz[de]isoquinoline-2(3H)-acetic acid per kilogram of feed for 2 days prior to the galactose feeding and also during the galactose feeding (average daily dose calculated upon average daily consumption of feed was 1.0 g of 1,3-dioxo-1H-benz[de]isoquinoline-2(3H)-acetic acid per kilogram of rat).

TABLE I

| | Dulcitol accumulation ($\mu$g/mg) |
|---|---|
| Untreated galactosemic rats | 2.52 ± 0.13* |
| Treated galactosemic rats | 1.65 ± 0.12 |
| percent decrease | 35% |
| "t" test | P<0.001 |

* The individual values found in several experiments (34 – 36 determinations) were combined and are expressed as ± standard error of the mean.

Likewise, it is shown that the compounds of this invention lessen the rate of formation of irreversible opacities and cataracts in the lenses of galactosemic rats.

More explicitly, a typical experiment to demonstrate this fact is illustrated by FIG. 1. In this experiment rats were fed a 30% galactose diet with and without 0.7% 1,3-dioxo-1H-benz[de]isoquinoline-2(3H)-acetic acid whereby the daily dose of the latter compound given to the treated rats decreased from about 1,080 mg/kg. during the first week to 650 mg/kg. during the seventh week.

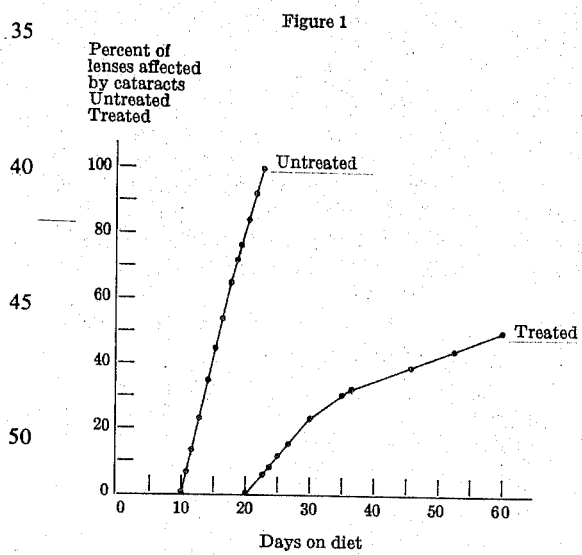

Figure 1

The results depicted by FIG. 1 show that it takes twice as long for cataracts to appear in the lenses of the group receiving the active ingredient of this invention, and that the further rate of appearance of cataracts is also much slower than in the untreated group. The treated group was kept 111 days at which time 67% of the lenses were affected as compared to 100% at 25 days in the untreated group used as control.

In experiments such as the one just described, lens damage becomes irreversible when the opacity thereof reaches stage 3 are graded by the method of Sipple, cited above.

This point of irreversibility may be used as an end-point to demonstrate the beneficial effect of the compounds of this invention in preventing or retarding the rate of appearance of irreversible opacities, a complication also associated with diabetes.

The results of such an experiment are depicted in FIG. 2. In this particular experiment rats were fed a 25% galactose diet with and without 0.7% of 1,3-dioxo-1H-benz[de]isoquinoline-2(3H)-acetic acid (the daily dose of this compound decreased from 1206 mg/kg. during the first week to 746 mg/kg. during the sixth week). The eyes were examined regularly by slit-lamp microscopy to detect the appearance of opacities.

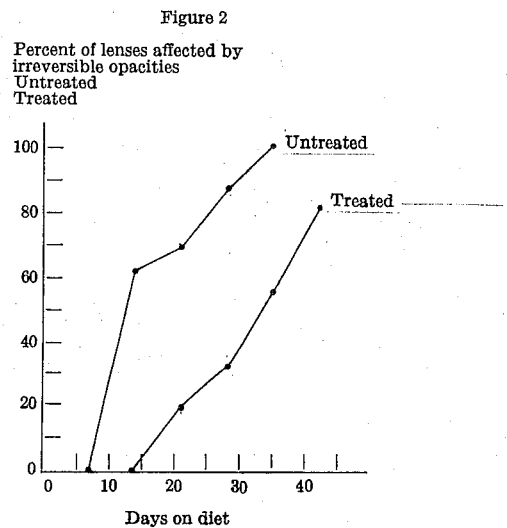

Figure 2
Percent of lenses affected by irreversible opacities

From FIG. 2 it can be seen readily that the appearance of irreversible damage (stages 3 and 4) was postponed by treatment of the galactosemic animals with the above active ingredient of this invention.

The galactosemic rat may also be used to demonstrate the protective effect of the compounds of this invention against the accumulation of dulcitol in the sciatic nerves thereof; this condition is analogous to the accumulation of sorbitol in advanced diabetic neuropathy.

The results of a typical experiment in which the rats were fed a 30% galactose diet for 7 days, presented in Table II, show that the accumulation of dulcitol in the sciatic nerve is markedly lowered by treatment with 1,-3-dioxo-1H-benz[de]isoquinoline-2(3H)-acetic acid (970 mg/kg./day). In this experiment the control rats were fed a 30% glucose diet.

TABLE II

| | Dulcitol accumulation ($\mu$g/mg) |
|---|---|
| Untreated galactosemic rats | 1.04 ± 0.13* |
| Treated galactosaemic rats | 0.42 ± 0.05 |
| percent decrease | 60% |
| "t" test | P<0.001 |

* Mean of 8 determinations ± standard error of the mean.

Furthermore, the diabetic rat model, described above, may be used to demonstrate the efficacy of the active ingredients of this invention to diminish sorbitol accumulation in the lens and sciatic nerve thereof, as well as to reduce the number of lenses with opacities normally expected to occur in such rats. The results of a typical experiment in which diabetic rats were treated with 1,3-dioxo-1H-benzo[de]isoquinoline-2(3H)-acetic acid (1070 mg/kg/day) for three weeks are depicted in Table III.

TABLE III

Effect of 1,3-Dioxo-1H-benz[de]isoquinoline-2(3H)-acetic acid (1070 mg/kg/day) on Lens Opacities and Tissular Sorbitol Accumulation after 3 Weeks in Diabetic Rats

| | Untreated | Treated | "t" test |
|---|---|---|---|
| Blood glucose (mg/100ml) | 364±19* | 333±7 | not significant |
| Lens opacities | | | |
| stage 0 | 46% | 96% | |
| stage 1 | 54% | 4% | |
| Lens sorbitol: | | | |
| accumulation ($\mu$g/mg) | 3.7±0.5 | 2.5±0.3 32%** | 0.05>P>0.02 |
| Sciatic nerve sorbitol: | | | |
| accumulation ($\mu$g/ml) | 1.37±0.10 | 0.84±0.06 39%** | P<0.001 |

* Mean of 9–13 determinations ± standard error of the mean.
** Precent decrease

The following examples will illustrate further this invention.

EXAMPLE 1

1,3-Dioxo-1H-benz[de]isoquinoline-2(3H)-acetic Acid 1,8-Naphthalic acid anhydride (110 g, 0.556 mole), glycine (48 g, 0.64 mole) and dimethylformamide (750 ml) are heated and stirred at reflux for 2 hr. The homogeneous dark solution is cooled to about 100° C and 750 ml of hot water is added slowly to the stirred solution. The reaction mixture is cooled and allowed to stand in a refrigerator for 16 hr. The precipitate is collected and recrystallized from ethanol, using decolorizing charcoal, to give the title compound, m.p. 271°–272° C.

In the same manner but using an equivalent amount of 4-bromo-1,8-naphthalic acid anhydride instead of 1,8-naphthalic acid anhydride, 6-bromo-1,3-dioxo-1H-benz[de]isoquinoline-2(3H)-acetic acid, m.p. 279°–281° C, after recrystallization from ethanol.

In the same manner but using an equivalent amount of 3-nitro-1,8-naphthalic acid anhydride instead of 1,8-naphthalic acid anhydride, 5-nitro-1,3-dioxo-1H-benz[de]isoquinoline-2(3H)-acetic acid, m.p. 273°–275° C, after recrystallization from isopropanol, is obtained.

EXAMPLE 2

5-Amino-1,3-dioxo-1H-benz[de]isoquinoline-2(3H)-acetic Acid

5-Nitro-1,3-dioxo-1H-benz[de]isoquinoline-2(3H)-acetic acid (7 g, 0.0233 mole) is dissolved in 5% NaHCO$_3$ solution (45 ml). The mixture is diluted with 120 ml of H$_2$O and Raney nickel (2.0 g) is added thereto.

The mixture is hydrogenated under 50 p.s.i. at 25° C and then rendered acidic (pH~4). The resulting precipitate is collected and recrystallized from 3% HCl solution to give the title compound, m.p. 292° C.

EXAMPLE 3

The percentages in this example of compositions for topical use refer to percent weight by volume.

| | |
|---|---|
| a) Sterile vehicle containing | Per cent |
| 1,3-dioxo-1H-benz[de]isoquinoline-2(3H)-acetic acid | 0.5 |
| chlorbutanol | 0.5 |
| sodium bisulfite | 0.3 |
| boric acid | 0.8 |
| sodium borate | 0.6 |
| water, q.s. ad 100 ml. | |
| b) Sterile vehicle containing | Per cent |
| 1,3-dioxo-1H-benz[de]isoquinoline-2(3H)-acetic acid | 1.0 |
| phenyl mercuric acetate | 0.002 |
| sodium bisulfite | 0.3 |
| sodium hydroxide or hydrochloric acid to pH | 7.2–7.6 |
| water, q.s. ad 100 ml. | |

In the foregoing compositions (a) and (b) of this example, the antioxidant, sodium bisulfite, may be varied in concentration from 0.3 to 0.03 per cent. The preservatives chlorbutanol and phenyl mercuric acetate, as well as the antioxidant, may be replaced by any perservative or antioxidant suitable for ophthalmic use. Sush preservatives and antioxidants are described in "Remington's Pharmaceutical Science," A. Osol, et al., Eds., 14th ed., Mack Publishing Co., Easton, Penn., 1970. Other suitable buffers, in place of sodium hydroxide and hydrochloric acid, and boric acid and sodium borate used above, may be substituted. Such suitable buffers are described also in the foregoing text.

Similar compositions for topical use may be prepared containing any of the other compounds listed above of formula I or the pharmaceutically acceptable salts of the compounds of formula I with an organic or inorganic base.

EXAMPLE 4

1,3-Dioxo-1H-benz[de]isoquinoline-2(3H)-acetic acid (20 g) is dissolved in 980 ml of distilled water containing 3.14 g of sodium hydroxide, the solution is made isotonic by addition of sodium chloride or sodium citrate or glucose, a preservative such as 0.1 percent weight by volume of methylparaban and 0.015 percent by weight by volume of propylparaban or 0.5 percent weight by volume of chlorbutanol is added, the solution is made up to 1000 ml with distilled water, sterilized by autoclaving or sterile filtration, and filled into 2 ml ampoules or vials, to make a solution for parenteral administration containing 20 mg/ml of the active ingredient.

b. In the same manner, but using 5g of 1,3-dioxo-1H-benz[de]isoquinoline-2(3H)-acetic acid, a solution for parenteral administration containing 5 mg/ml of the active ingredient is obtained and is filled into 2 ml ampoules or vials.

c. 1,3-Dioxo-1H-benz[de]isoquinoline-2(3H)-acetic acid (20 g) is suspended in 965 g of sesame oil and 15g of benzyl alcohol by means of a mechanical blender. The suspension is filled into 2 ml ampoules or vials. After autoclaving, a suspension containing 2% of the active ingredient by weight is obtained for parenteral administration.

d. Again in the same manner, but using 0.225 g, 0.45 g, 2.5 g, or 10.0 g of 1,3-dioxo-1H-benz[de]isoquinoline-2(3H)-acetic acid alone, without additives or preservatives, solutions for parenteral or oral administration for pharmacological purposes containing 0.225 mg/ml, 0.45 mg/ml, 2.5 mg/ml, and 10.0 mg/ml of the active ingredient are obtained, respectively.

EXAMPLE 5

1,3-Dioxo-1H-benz[de]isoquinoline-2(3H)-acetic acid (50 g) is mixed with 150 grams lactose, 44 grams starch, 4 grams magnesium stearate and 2 grams sucrose. The mixture is granulated with addition of a small amount of water, dried and compressed into tablets weighing 250 mg each, to make 1,000 tablets containing 50 mg each of the active ingredient.

b. In the same manner, but using 100 g of 1,3-dioxo-1H-benz[de]isoquinoline-2(3H)-acetic acid, 190 g lactose, 44 g starch, 4 g magnesium stearate, and 2 g sucrose, there are obtained 1,000 tablets of 250 mg weight each, such tablets containing 10 mg each of the active ingredient.

c. Again in the same manner, but using 25 g of 1,3-dioxo-1H-benz[de]isoquinoline-2(3H)-acetic acid, 175 g lactose, 44 g starch, 4 g magnesium stearate, and 2 g of sucrose, there are obtained 1,000 tablets of 250 mg weight each, such tablets containing 25 mg each of the active ingredient.

We claim:

1. A pharmaceutical composition for preventing or relieving diabetes mellitus associated complications consisting of cataracts, neuropathy, nephropathy and retinopathy in a diabetic mammal containing as the active ingredient a compound of the formula

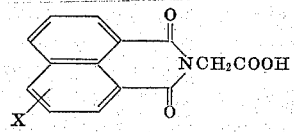

in which X is selected from the group consisting of hydrogen, 5-nitro, 5-amino and 6-bromo or a pharmaceutically acceptable salt thereof with an organic or inorganic base and a solid pharmaceutical carrier, the composition containing from about 50 to about 500 milligrams of active ingredient.

2. A pharmaceutical composition for preventing or relieving diabetes mellitus associated complications consisting of cataracts, neuropathy, nephropathy and retinopathy in a diabetic mammal containing as the active ingredient a compound of the formula

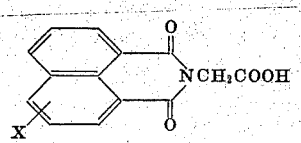

in which X is selected from the group consisting of hydrogen, 5-nitro, 5-amino and 6-bromo or a pharmaceutically acceptable salt thereof with an organic or inorganic base and a liquid pharmaceutical carrier, the composition containing from about 0.225 to 20 milligrams per milliliter of active ingredient.

3. A pharmaceutical composition for topical application for preventing or relieving diabetes mellitus associated complications consisting of cataracts and retinopathy in a diabetic mammal containing as the active ingredient a compound of the formula

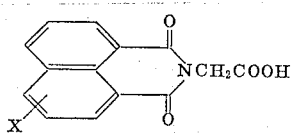

in which X is selected from the group consisting of hydrogen, 5-nitro, 5-amino and 6-bromo or a pharmaceutically acceptable salt thereof with an organic or inorganic base and a liquid pharmaceutical carrier, the composition containing 0.5 to 2% by volume of active ingredient.

4. A method of preventing or relieving diabetes mellitus associated complications consisting of cataracts and retinopathy in a diabetic mammal which comprises topically administering to said mammal an alleviating or prophylactic amount of a sterile aqueous solution containing 0.5 to 2% by volume of a compound of the formula

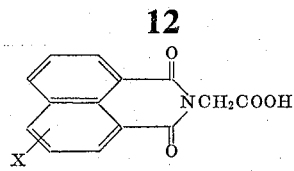

in which X is selected from the group consisting of hydrogen, 5-nitro-, 5-amino and 6-bromo- or a pharmaceutically acceptable salt thereof with an organic or inorganic base.

5. A method of preventing or relieving diabetes mellitus associated complications consisting of neuropathy and nephropathy in a diabetic mammal which comprises orally or parenterally administering to said mammal an alleviating or prophylactic amount of a compound of the formula

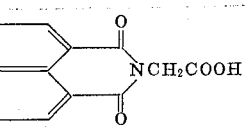

in which X is selected from the group consisting of hydrogen, 5-nitro-, 5-amino and 6-bromo- or a pharmaceutically acceptable salt thereof with an organic or inorganic base.

* * * * *

UNITED STATES PATENT OFFICE
CERTIFICATE OF CORRECTION

PATENT NO. : 3,821,383
DATED : June 28, 1974
INVENTOR(S) : K. Sestanj; D.N. Simard and D.M. Dvornik It is certified that error appears in the above-identified patent and that said Letters Patent are hereby corrected as shown below:

Column 5, line 24, for "stropine" read --atropine--.

Column 6, Fig. 1, lines 36 to 38, strike out "untreated" and "Treated" in upper left corner of graph.

Column 6, line 66, for "Sipple" read --Sippel--.

Column 7, Fig. 2, lines 15 to 17, strike out "Untreated" and "Treated" in upper left corner of graph.

Column 9, line 31, for "sush" read --such--.

Column 1, line 38, for "Heyringen" read --Heyningen--.

Column 4, line 25, for "6-bromo-13,-dioxo-" read --6-bromo-1,3-dioxo---.

Signed and sealed this 13th day of May 1975.

(SEAL)
Attest:

RUTH C. MASON
Attesting Officer

C. MARSHALL DANN
Commissioner of Patents
and Trademarks